(12) United States Patent
An et al.

(10) Patent No.: US 7,687,042 B2
(45) Date of Patent: Mar. 30, 2010

(54) REFORMER OF FUEL CELL SYSTEM

(75) Inventors: Seong-Jin An, Suwon-si (KR); Ju-Yong Kim, Suwon-si (KR); Ho-Jin Kweon, Suwon-si (KR)

(73) Assignee: Samsung SDI Co., Ltd, Suwon-si (KR)

( * ) Notice: Subject to any disclaimer, the term of this patent is extended or adjusted under 35 U.S.C. 154(b) by 1077 days.

(21) Appl. No.: 11/255,131

(22) Filed: Oct. 19, 2005

(65) Prior Publication Data

US 2006/0112637 A1 Jun. 1, 2006

(30) Foreign Application Priority Data

Nov. 29, 2004 (KR) .................. 10-2004-0098549

(51) Int. Cl.
*B01J 19/00* (2006.01)
(52) U.S. Cl. ............... 422/198; 422/190; 422/195; 422/197; 422/201; 422/203; 422/211; 422/188; 422/189; 422/196; 422/187; 422/202; 429/19; 429/20; 60/780
(58) Field of Classification Search ......... 422/188–190, 422/180, 211, 197
See application file for complete search history.

(56) References Cited

U.S. PATENT DOCUMENTS

| | | | |
|---|---|---|---|
| 5,199,961 A | | 4/1993 | Ohsaki et al. |
| 5,458,857 A | * | 10/1995 | Collins et al. ............ 422/198 |
| 6,436,354 B1 | * | 8/2002 | Priegnitz et al. ......... 422/198 |
| 7,166,139 B2 | | 1/2007 | Wunning |
| 2002/0090329 A1 | | 7/2002 | Ternan |
| 2002/0152681 A1 | | 10/2002 | Oh et al. |
| 2004/0172877 A1 | | 9/2004 | Wunning |

FOREIGN PATENT DOCUMENTS

| | | |
|---|---|---|
| CN | 1514801 | 7/2001 |
| EP | 0 600 621 A1 | 6/1994 |
| EP | 0 615 949 A2 | 9/1994 |
| EP | 0 921 584 A2 | 6/1999 |
| EP | 1 031 374 A2 | 8/2000 |

(Continued)

OTHER PUBLICATIONS

European Search Report for EP 05110101.2-2111 dated Mar. 10, 2006, corresponding to priority application 10-2004-0098549.

(Continued)

*Primary Examiner*—Jennifer Michener
*Assistant Examiner*—Kaity V. Handal
(74) *Attorney, Agent, or Firm*—Christie, Parker & Hale, LLP

(57) ABSTRACT

A reformer of a fuel cell system includes a heat source unit for generating heat, a reforming reaction unit for generating a reforming gas containing hydrogen from a fuel through a fuel reforming reaction using the heat, a carbon monoxide reducing unit connected to a reforming reaction unit to reduce a concentration of carbon monoxide contained in the reforming gas, and a thermal treatment unit disposed outside the reforming reaction unit and the carbon monoxide reducing unit to adjust the thermal energy supplied to the reforming reaction unit and the carbon monoxide reducing unit.

25 Claims, 7 Drawing Sheets

FOREIGN PATENT DOCUMENTS

| | | |
|---|---|---|
| EP | 1 031 374 A3 | 5/2001 |
| GB | 2 247 414 A | 3/1992 |
| JP | 5-105401 A | 4/1993 |
| JP | 2001-155756 A | 6/2001 |
| JP | 2002-137905 A | 5/2002 |
| JP | 2004-531447 A | 10/2004 |
| KR | 2002-0082061 | 10/2002 |
| WO | WO 2005/084771 A2 | 9/2005 |

OTHER PUBLICATIONS

Korean Patent Abstracts, Publication No. 1020020082061 A; Publication Date: Oct. 30, 2002; in the name of Baek et al.

* cited by examiner

REFORMER OF FUEL CELL SYSTEM

CROSS REFERENCE TO RELATED APPLICATION

This application claims priority to and the benefit of Korean Patent Application No. 10-2004-0098549, filed on Nov. 29, 2004, in the Korean Intellectual Property Office, the entire content of which is incorporated herein by reference.

BACKGROUND OF THE INVENTION

1. Field of the Invention

The present invention relates to a fuel cell system and, more particularly, to a reformer having an improved heat transfer structure.

2. Description of the Related Art

As is well known, a fuel cell is an electricity generating system for directly converting chemical reaction energy of oxygen and hydrogen contained in a hydrocarbon fuel into electrical energy.

Fuel cells can be classified into polymer electrolyte membrane fuel cells and direct oxidation membrane fuel cells.

The polymer electrolyte membrane fuel cell has been recently developed to have excellent output characteristics, low operating temperatures, and fast starting and response characteristics. Therefore, the polymer electrolyte membrane fuel cell has a wide range of applications, including mobile power sources for vehicles, distributed power sources for homes or other buildings, and small-size power sources for electronic apparatuses.

The polymer electrolyte membrane fuel cell system includes a fuel cell body (hereinafter, referred to as a stack), a reformer for reforming a fuel to generate hydrogen and for supplying the hydrogen to the stack, and an air pump, or a fan, for supplying oxygen to the stack. The stack generates electrical energy through an electrochemical reaction between the hydrogen supplied from the reformer and the oxygen supplied by driving the air pump or the fan.

In the conventional fuel cell system, the reformer includes a heat source unit for providing thermal energy in a predetermined temperature range by using exothermic and endothermic reactions with catalysts, a reforming reaction unit for generating reforming gas (i.e., hydrogen-rich gas) from a fuel through a reforming reaction by using the thermal energy, and a carbon monoxide reducing unit for reducing a concentration of carbon monoxide contained in the reforming gas.

However, in the conventional reformer, the heat source unit and the reforming reaction unit are disposed in a distributed manner to transfer the thermal energy generated from the heat source unit to the reforming reaction unit (i.e., the heat source unit and the reforming reaction unit are provided separately). Therefore, in the conventional reformer, the exchange of thermal energy between the heat source and the reforming reaction unit is not directly performed, so that there is a problem in terms of thermal transfer efficiency. In particular, since the heat source unit transfers the thermal energy from outside of the reforming reaction unit to the reforming reaction unit, the thermal energy is not completely transferred to the reforming reaction unit but, instead, is partially released to the outside. Therefore, there is a problem of deterioration in reaction efficiency and thermal efficiency of the entire reformer. In addition, in the conventional reformer, since the heat source unit and the reforming reaction unit are disposed in a distributed manner, there is a problem in that the entire system is not compact.

In addition, in the conventional reformer, optimal operation efficiency can be obtained only if the thermal energy is in a temperature range that corresponds to specific temperatures of the reforming reaction unit and the carbon monoxide reducing unit. However, the transfer of the thermal energy to the reforming reaction unit and the carbon monoxide reducing unit cannot be easily controlled, so that there is a problem in that it is difficult to maximize the operation efficiency of the entire reformer.

SUMMARY OF THE INVENTION

An embodiment of the present invention provides a reformer of a fuel cell system capable of improving reaction efficiency and thermal efficiency with a simple structure and capable of easily controlling the thermal energy required for the entire operation of the reformer to maximize operation efficiency.

One embodiment of the present invention provides a reformer of a fuel cell system including a heat source unit for generating heat, a reforming reaction unit for generating a reforming gas containing hydrogen from a fuel through a fuel reforming reaction by using the heat, and a channel member connected to the reforming reaction unit and having channels for transporting the fuel and the reforming gas, wherein the channels are integrally formed into the channel member.

In the embodiment of the present invention, the reforming reaction unit may include a surround region (e.g., a cavity) for surrounding the heat source unit and a reactor body having a predetermined internal space to contain a reforming catalyst, wherein the reactor body may include a fuel injection hole for injecting the fuel into the reactor body and a reforming gas outlet for discharging the reforming gas out of the reactor body.

In addition, the channel member may be formed in a shape of a coil to wind around an outer surface of the reactor body.

Also, the channel member may include a first channel for transporting the fuel and a second channel disposed in the center of the first channel to transport the reforming gas.

Further, the first channel may include a fuel inlet disposed at one end of the first channel and a fuel outlet disposed at another end of the first channel, wherein the fuel outlet is connected to the fuel injection hole of the reactor body.

In addition, the second channel may include a reforming gas inlet disposed at one end of the second channel and a reforming gas outlet disposed at another end of the second channel, wherein the reforming gas inlet may be connected to the reforming gas outlet of the reactor body.

Additionally, the heat source unit may include a burner body disposed in the surround region (e.g., the cavity) of the reforming reaction unit to generate the heat by igniting and burning a predetermined amount of fuel.

In addition, the reformer may further include a housing having a hermetically-sealed space for entirely containing the heat source unit and the reforming reaction unit to circulate the heat from the surround region to the hermetically-sealed space.

In addition, the reformer may further include a carbon monoxide reducing unit connected to the reforming gas outlet of the second channel to reduce a concentration of carbon monoxide contained in the reforming gas.

According to another embodiment of the present invention, there is provided a reformer of a fuel cell system including a heat source unit for generating heat, a reforming reaction unit for generating a reforming gas containing hydrogen from a fuel through a fuel reforming reaction by using the heat, a carbon monoxide reducing unit connected to the reforming reaction unit to reduce a concentration of carbon monoxide contained in the reforming gas, and a thermal treatment unit disposed outside the reforming reaction unit and the carbon monoxide reducing unit to adjust thermal energy supplied to the reforming reaction unit and the carbon monoxide reducing unit.

In this embodiment of the present invention, the reforming reaction unit may include a first reactor having a first predetermined internal space to contain a first catalyst, and the first reactor body may include a first injection hole for injecting the fuel into the first internal space, a first outlet for discharging the reforming gas from the first internal space, and a surround region (e.g., a cavity) for surrounding the heat source unit.

In addition, the heat source unit may include a burner body disposed in the surround region to generate the heat by igniting and burning a predetermined amount of fuel, the burner having a plurality of nozzle holes.

In addition, the carbon monoxide reducing unit may include a second reactor body having a second predetermined internal space to contain a second catalyst, and the second reactor body may include a second injection hole for injecting the reforming gas into the second internal space and a second outlet for discharging the reforming gas from the second internal space.

In addition, the thermal treatment unit may include a housing having a hermetically-sealed space for entirely containing the burner body, the first reactor body, and the second reactor body, to circulate the heat from the surround region to the hermetically-sealed space. In addition, the housing may include a material selected from a group consisting of heat-isolating ceramic, stainless steel, zirconium, and combinations thereof.

In addition, the thermal treatment unit may include a first channel member having a shape of a coil to wind around an outer surface of the first reactor body and adapted to circulate the fuel, and a second channel member connected to the first channel member and having channels having a shape of a coil to wind around an outer surface of the second reactor body and adapted to circulate the fuel and the reforming gas, wherein the channels are integrally formed into the second channel member.

In addition, the first channel member may include a first channel having one end connected to the first injection hole of the first reactor body and another end connected to the second channel member.

Additionally, the second channel member may include a second channel for transporting the fuel and a third channel disposed in the center of the second channel to transport the reforming gas.

Further, the second channel may include a first channel-inlet disposed at one end of the second channel and a first channel-outlet disposed at another end of the second channel, and wherein the first channel-outlet is connected to the another of the first channel.

Still further, the third channel may include a second channel-inlet disposed at one end of the third channel and a second channel-outlet disposed at another end of the third channel, wherein the second channel-inlet may be connected to the first outlet of the first reactor body, and the second channel-outlet may be connected to the second injection hole of the second reactor body.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, certain embodiments of the present invention are shown and described, by way of illustration. As those skilled in the art would recognize, the described embodiments may be modified in various ways, all without departing from the spirit or scope of the present invention. Accordingly, the drawings and description are to be regarded as illustrative in nature, rather than restrictive.

Figure 1:
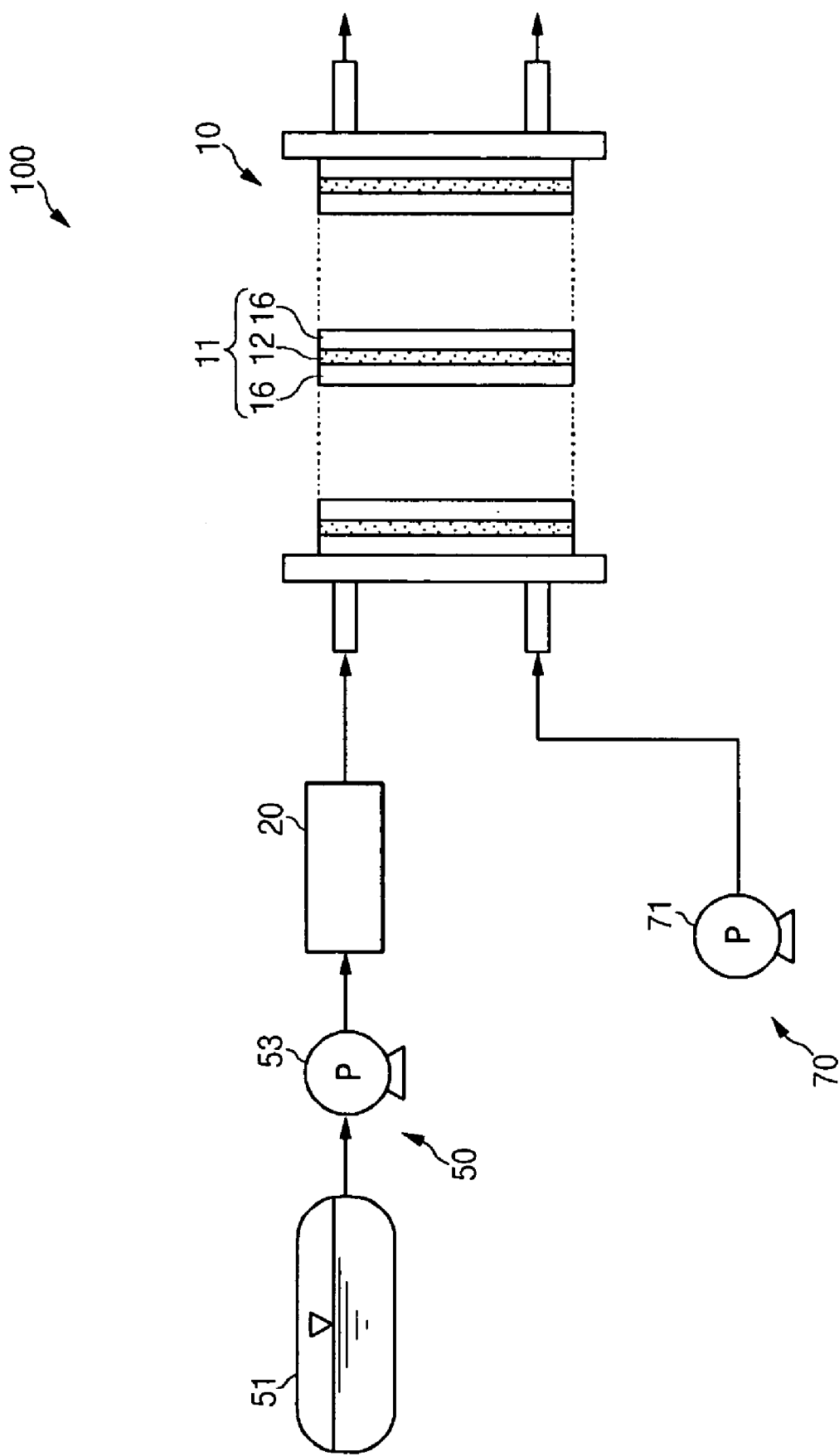
FIG. 1 is a schematic block diagram showing a construction of a fuel cell system according to embodiments of the present invention.

FIG. 1 is a schematic block diagram illustrating an entire construction of a fuel cell system 100 according to an embodiment of the present invention.

Referring to FIG. 1, the fuel cell system 100 generates a reforming gas containing hydrogen by reforming a fuel and generates electrical energy through an oxidation reaction of the reforming gas and the reduction reaction of an oxidant gas. As used in the specification, reforming gas could refer to gas that has passed through the reformer. Thus, reforming gas could mean reformed gas. However, one skilled in the art will be able to distinguish whether the gas has been reformed by determining if the gas has been processed by the reformer.

The type of fuel used for the fuel may include a liquid or gas fuel containing hydrogen, such as methanol, ethanol, liquid petroleum gas (LPG), liquefied natural gas (LNG), or gasoline.

The oxidant gas used for the fuel cell system 100 may be oxygen stored in a separate storage tank. Alternatively, air containing oxygen may be used as the oxidant gas. Hereinafter, the latter is exemplified.

The fuel cell system 100 includes a stack 10 for generating electrical energy through a reaction of hydrogen and oxygen, a reformer 20 for generating a reforming gas by reforming the fuel and supplying the reforming gas to the stack 10, a fuel supply unit 50 for supplying the fuel to the reformer 20, and an oxygen supply unit 70 for supplying the oxygen to the stack 10.

The stack 10 includes electricity generators 11 which are connected to the reformer 20 and the oxygen supply unit 70. The electricity generators receive the reforming gas from the reformer 20 and the oxygen from the oxygen supply unit 70 to generate electrical energy through a reaction of the hydrogen and oxygen. The electricity generators 11 are provided in cell units. That is, a plurality of electricity generators 11 are stacked adjacent to one another form the stack 10.

One electricity generator 11 constitutes a minimum unit of a fuel cell, in which a membrane assembly 12 is disposed between separators 16 (referred to as bipolar plates).

The stack 10 can be constructed as any suitable stack of a polymer electrolyte membrane fuel cell.

In the embodiment, the reformer 20 generates the reforming gas containing hydrogen from the fuel through a catalytic reaction of the fuel using heat, for example, a steam reforming reaction, a partial oxidation reaction, and/or an auto-thermal reaction, and reduces a concentration of carbon monoxide contained in the reforming gas. The construction of the reformer 20 will be described below with reference to FIGS. 2, 3 and 4.

A fuel supply unit 50 for supplying a fuel to the reformer 20 includes a fuel tank 51 for storing the fuel and a fuel pump 53 for discharging the fuel stored in the fuel tank 51.

The oxygen supply unit 70 includes an air pump 71 for pumping air and for supplying the air to the electricity generator 11 of the stack 10 with a predetermined pumping pressure. Here, the oxygen supply unit 70 is not limited to include aforementioned air pump 71, and the oxygen supply unit 70 may instead include a fan having a suitable structure.

Figure 2:
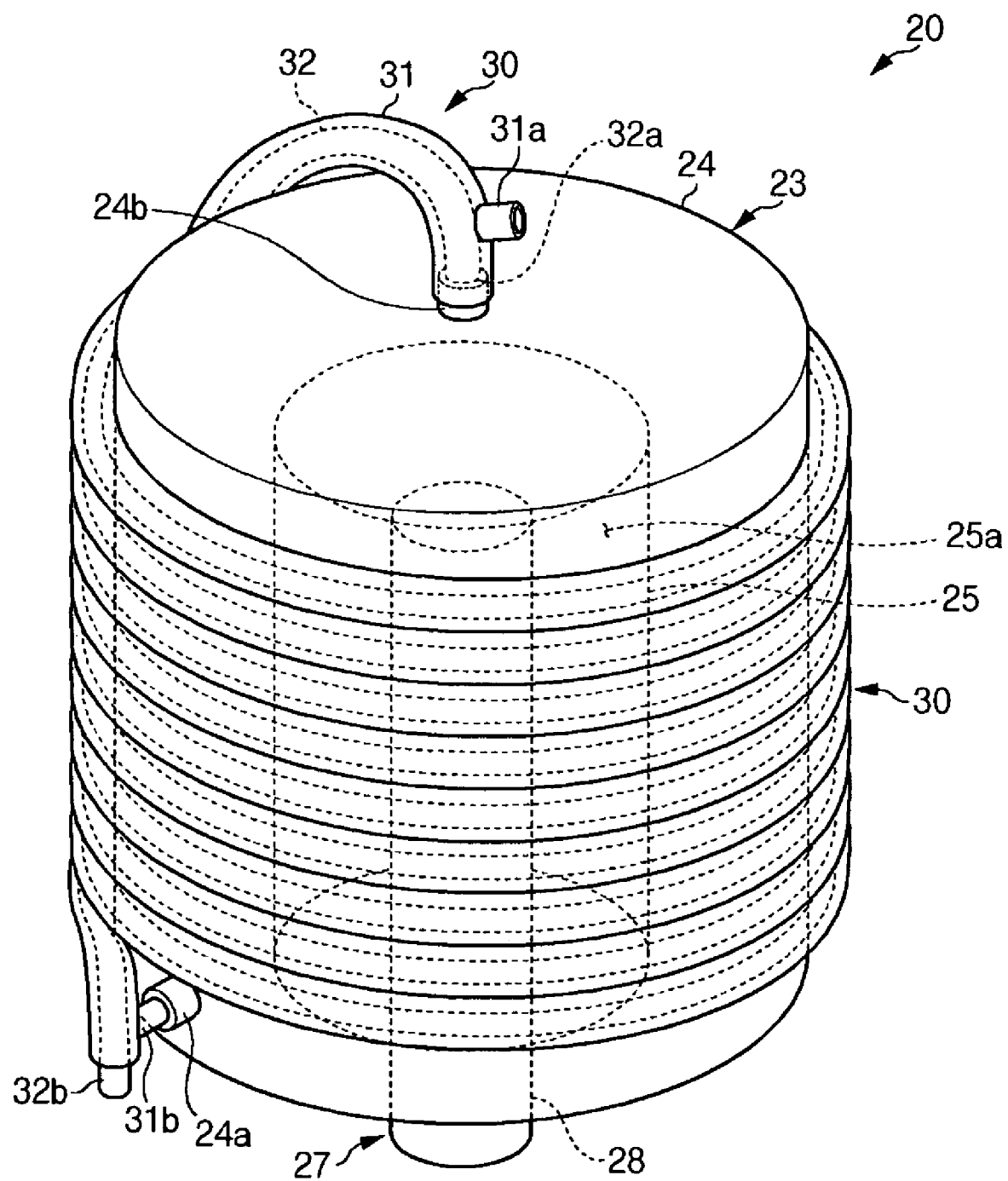
FIG. 2 is a schematic perspective view showing a construction of a reformer according to a first embodiment of the present invention.
Figure 3:
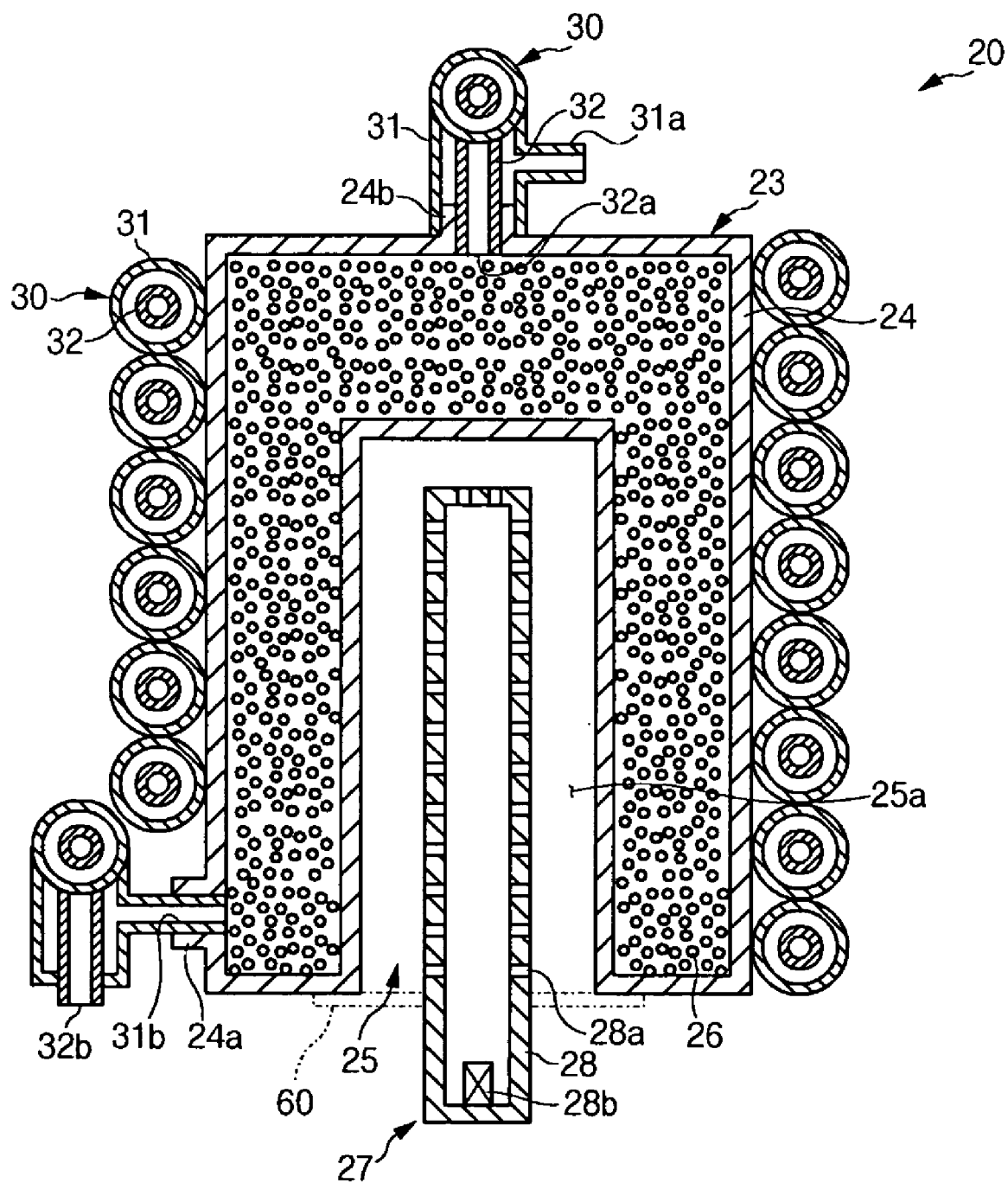
FIG. 3 is a cross-sectional view of FIG. 2.

FIG. 2 is a schematic perspective view showing a construction of a reformer according to a first embodiment of the present invention, and FIG. 3 is a cross-sectional view of FIG. 2.

Referring to the FIGS. 2 and 3, the reformer 20 according to the embodiment includes a reforming reaction unit 23 for generating a reforming gas containing hydrogen through a reforming reaction of the fuel using heat, and a heat source unit 27 disposed in the reforming reaction unit 23 to generate the heat.

In the embodiment, the reforming reaction unit 23 includes a reactor body 24 having an internal space and a reforming catalyst 26 contained in the internal space of the reactor body 24 to promote the fuel reforming reaction.

The reactor body 24 has a closed cylindrical structure, of which both ends are closed to form an internal space. The reactor body 24 has a mounting part 25 for accommodating a heat source unit 27, as described below. The mounting part 25 has a surround region (e.g., a cavity) 25a formed by recessing the reactor body 24 to a predetermined depth in a direction of from one end of the reactor body 24 to the other end of the reactor body 24.

Here, the surround region 25a is a space for accommodating the heat source unit 27. The surround region 25a can be referred to as an inner region of the reactor body 24.

At one end of the reactor body 24, a fuel injection hole 24a for injecting the fuel into the internal space of the reactor body 24 is disposed. At the other end of the reactor body 24, a reforming gas outlet 24b for discharging the reforming gas generated through the fuel reforming reaction from the internal space of the reactor body 24 is disposed. Here, the reactor body 24 may be made of a thermally conductive metal, such as aluminum, copper, and/or iron, in order to readily receive (conduct) the heat generated from the heat source unit 27.

The reforming catalyst 26 is contained in the internal space of the reactor body 24. The forming catalyst 26 has a structure wherein a catalytic material, such as platinum (Pt) and/or ruthenium (Ru), is contained in pellet-shaped carriers made of alumina ($Al_2O_3$), silica ($SiO_2$), and/or titania ($TiO_2$). Alternatively, the reforming catalyst 26 has a honeycomb structure wherein a catalytic material is contained in a ceramic or metal container having a plurality of parallel through holes, that is, cells.

In the reforming reaction unit 23, since the fuel reforming reaction using the reforming catalyst 26 is an endothermic reaction, the reformer 20 according to the embodiment includes the heat source unit 27 for generating the heat used for the reforming reaction of the reforming reaction unit 23.

The heat source unit 27 has a construction of igniting and burning a predetermined amount of fuel together with the air to generate the heat.

More specifically, the heat source unit 27 has a burner body 28 mounted in the mounting part 25 of the reactor body 24. The burner body 28 is substantially pipe shaped and is disposed within the surround region 25a of the mounting part 25. The burner body 28 may be mounted in the reactor body 24 by a support bracket 60 indicated by a dash line. In one embodiment, the burner body 28 is mounted in the reactor body 24 to be separated from an inner wall forming the surround region 25a of the reactor body 24 and to be surrounded by the inner wall.

A general ignition plug 28b for igniting the fuel and air is disposed in the burner body 28. A plurality of nozzle holes 28a for spraying a high temperature combustion gas, generated during the combustion of the fuel and air, to the surround region 25a of the reactor body 24 are disposed in the burner body 28. Here, the heat generated by the combustion of the fuel and air has different temperatures depending on the type of the fuel. For example, in the case of a liquid fuel, such as methanol or ethanol, the temperature is in a range from about 200 to 350° C., and in the case of a gas fuel such as LPG or LNG, the temperature is in a range from about 750 to 800° C. Hereinafter, an example wherein the heat source unit 27 generates heat by burning the gas fuel and the air will be described.

The reformer 20 includes a channel member 30 according to the present invention. The channel member 30 has a function of transferring the heat generated from the heat source unit 27 and the heat of the reforming gas to the fuel supplied to the reforming reaction unit 23. Here, the fuel used is a liquid fuel stored in the fuel tank 51 of the fuel supply unit 50.

In the embodiment, the channel member 30 includes channels for transporting the fuel and the reforming gas, wherein the channels are integrally formed in the channel member 30. The channel member 30 is connected to the reactor body 24 of the reforming reaction unit 23 and has a double-pipeline structure where the channel member 30 winds around an outer surface of the reactor body 24 in a shape of a coil.

More specifically, the channel member 30 includes a first channel 31 for transporting the fuel and a second channel 32 for transporting the reforming gas discharged from the reforming reaction unit 23. As described previously, gas that has been discharged from the reforming reaction unit 23 could also be referred to as a reformed gas. Here, the second channel 32 is disposed in the center of the first channel 31.

The first channel 31 includes a first inlet 31a disposed at one end of the first channel 31 and a first outlet 31b disposed at the other end of the first channel 31. Here, the first inlet 31a is connected to the fuel tank 51 of the fuel supply unit 50 via a pipeline. The first outlet 31b is connected to the fuel injection hole 24a of the reactor body 24.

The second channel 32 includes a second inlet 32a disposed at one end of the second channel 32 and a second outlet 32b disposed at the other end of the second channel 32. Here, the second inlet 32a is connected to the reforming gas outlet 24b of the reactor body 24. The second outlet 32b is connected to the electricity generator 11 (FIG. 1) of the stack 10 (FIG. 1) via a pipeline.

By using the above described construction, when the reformer 20 according to the present invention is operated, the gas fuel, such as LPG or LNG, and the air are supplied.

In this state, the gas fuel and the air are ignited by the ignition plug 28b. Then, the fuel and the air are burned in the burner body 28, and thus, the heat and the combustion gas are generated at a predetermined temperature range. Here, the combustion gas is sprayed on the surround region 25a of the reactor body 24 through the nozzle holes 28a of the burner body 28.

The heat is supplied to the reactor body 24 and the reforming catalyst 26 in the reactor body 24. Here, since the channel member 30 according to the embodiment winds around the outer surface of the reactor body 24 in a shape of a coil, the first channel 31 of the channel member 30 is heated to a predetermined temperature by the transferred heat.

In another part of the process, by driving the fuel pump 53, the fuel stored in the fuel tank 51 is supplied to the reactor body 24 of the reforming reaction unit 23 through the first channel 31. The fuel flows in a helical direction along the first channel 31 and receives the heat transferred to the first channel 31. By doing so, the fuel is preheated in a predetermined temperature and supplied to the internal space of the reactor body 24 through the fuel injection hole 24a of the reactor body 24.

As a result, in the reforming reaction unit 23, the reforming gas containing hydrogen is generated through the fuel reforming reaction using the heat and the reforming catalyst 26. The reforming gas is discharged through the reforming gas outlet 24b of the reactor body 24 and is supplied to the electricity generator 11 of the stack 10 through the second channel 32 of the channel member 30. Here, since the channel member 30 has the double-pipeline structure, the reforming gas flows in the helical direction along the second channel 32 to be cooled by the fuel flowing through the first channel 31 at a relatively low temperature, so that the reforming gas can be maintained at a temperature range corresponding to the specific operation temperature of the stack 10.

At the same time, by driving the air pump 71, the air is supplied to the electricity generator 11 of the stack 10.

Then, the electricity generator 11 of the stack 10 outputs a predetermined amount of electrical energy through the oxidation reaction of the reforming gas and the reduction reaction of the oxygen contained in the air.

Figure 4:
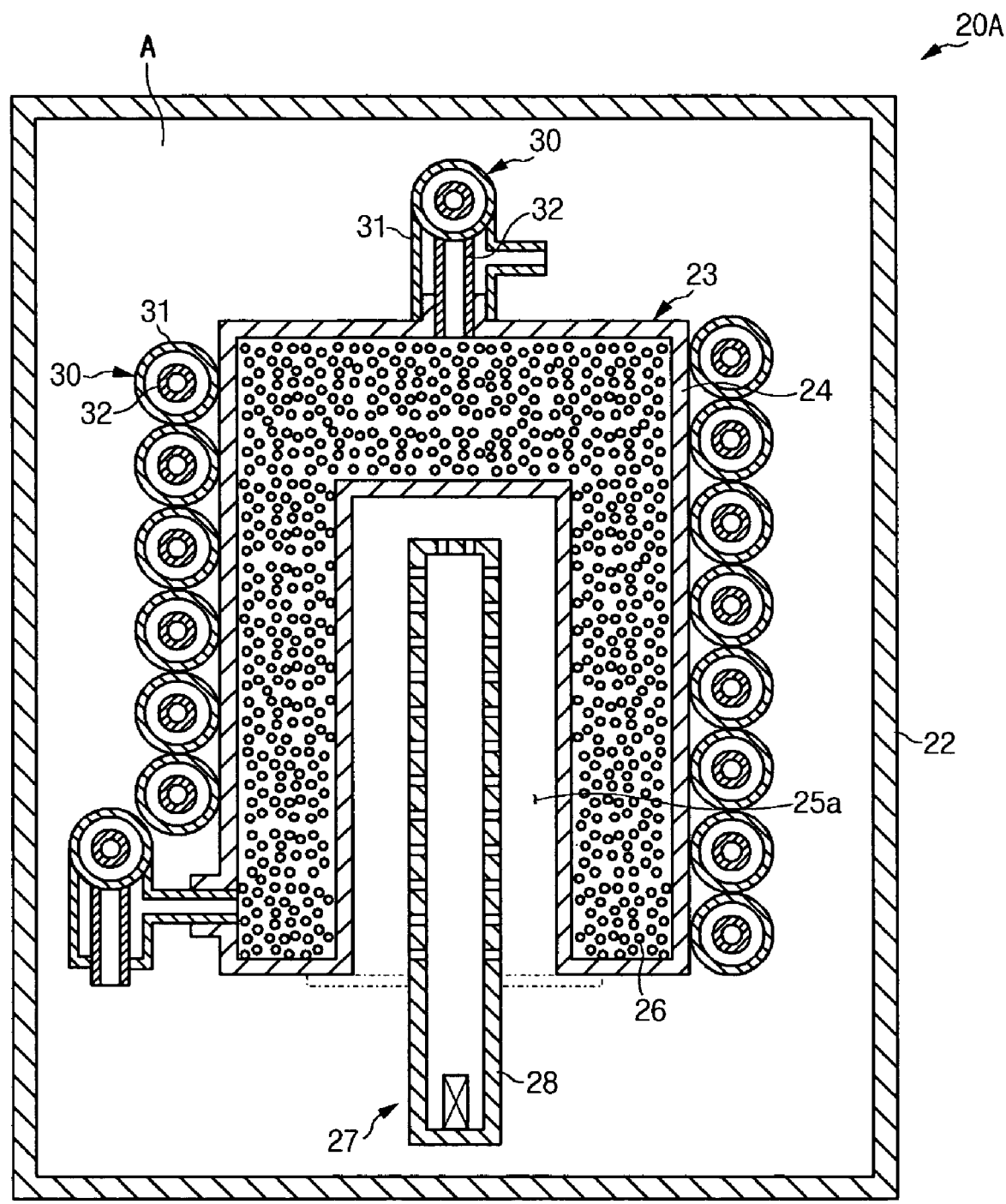
FIG. 4 is a schematic cross-sectional view showing a construction of a reformer according to a second embodiment of the present invention.

FIG. 4 is a schematic cross-sectional view showing a construction of a reformer according to a second embodiment of the present invention.

Referring to the FIG. 4, a reformer 20A according to the embodiment has substantially the same structure of the aforementioned embodiment, but in order to maximize the thermal energy efficiency of the thermal energy generated from the heat source unit 27, an additional structure for circulating the thermal energy along an outside of the reforming reaction unit 23 through the surround region (e.g., the cavity) 25a of the reforming reaction unit 23 is included.

Therefore, the reformer 20A according to the second embodiment includes a housing 22 for containing the heat source unit 27 and the reforming reaction unit 23. The housing 22 has a hermetically-sealed space (indicated by A in the FIG. 4) to accommodate the reforming reaction unit 23. Here, in one embodiment, an inner wall of the housing 22 is separated by a predetermined distance from an outer wall of the reforming reaction unit 23. By doing so, a flow line is formed to circulate the heat generated by the heat source unit 27 from the surround region 25a of the reactor body 24 to the outside of the reactor body 24. In addition, the housing 22 has an outlet (not shown) for discharge of the combustion gas which circulates in the hermetically-sealed space A.

In this embodiment, the housing 22 may be made of a heat-isolating metal and/or a non-metal material having a low thermal conductivity such as stainless steel, ceramic, and/or zirconium. Alternatively, the housing 22 may have a separate heat-isolating layer (not shown) at the inner wall of the housing 22.

In addition, the reformer 20A according to the embodiment includes a channel member 30 along the thermal energy flow line described above. The channel member 30 is substantially the same as in the first embodiment. That is, the channel member 30 has the double-pipeline structure of the first and second channels 31 and 32 of the first embodiment, and thus, a detailed description thereof will not be provided again.

During the operation of the reformer 20A according to the embodiment, some portion of the heat generated from the heat source unit 27 is transferred through the inner wall forming the surround region 25a to the reactor body 24 and the reforming catalyst 26 in the reactor body 24. The remaining heat is circulated through the surround region 25a to the hermetically-sealed space A of the housing 22. Since the channel member 30 winds around the outer surface of the reactor body 24 in a shape of a coil, the first channel 31 of the channel member 30 is heated at a predetermined temperature by the thermal energy transferred from the reactor body 24 and the thermal energy circulating in the hermetically-sealed space A.

Therefore, by driving the fuel pump 53 (FIG. 1), the fuel stored in the fuel tank 51 (FIG. 1) is supplied to the reactor body 24 of the reforming reaction unit 23 through the first channel 31 of the channel member 30. Here, during the flowing of the fuel along the first channel 31, the fuel preheated at a predetermined temperature by the heat transferred from the first channel 31 is supplied to the internal space of the reactor body 24.

By doing so, the reforming reaction unit 23 generates the reforming gas containing hydrogen through a fuel reforming reaction using the reforming catalyst 26. The reforming gas is supplied through the second channel 32 of the channel member 30 to the electricity generator 11 (FIG. 1) of the stack 10 (FIG. 1). Here, since the channel member 30 has the double-pipeline structure, the reforming gas flows in the helical direction along the second channel 32 to be cooled by the fuel flowing through the first channel 31 at a relatively low temperature, so that the reforming gas can be maintained at a temperature range corresponding to the specific operation temperature of the stack 10.

Figure 5:
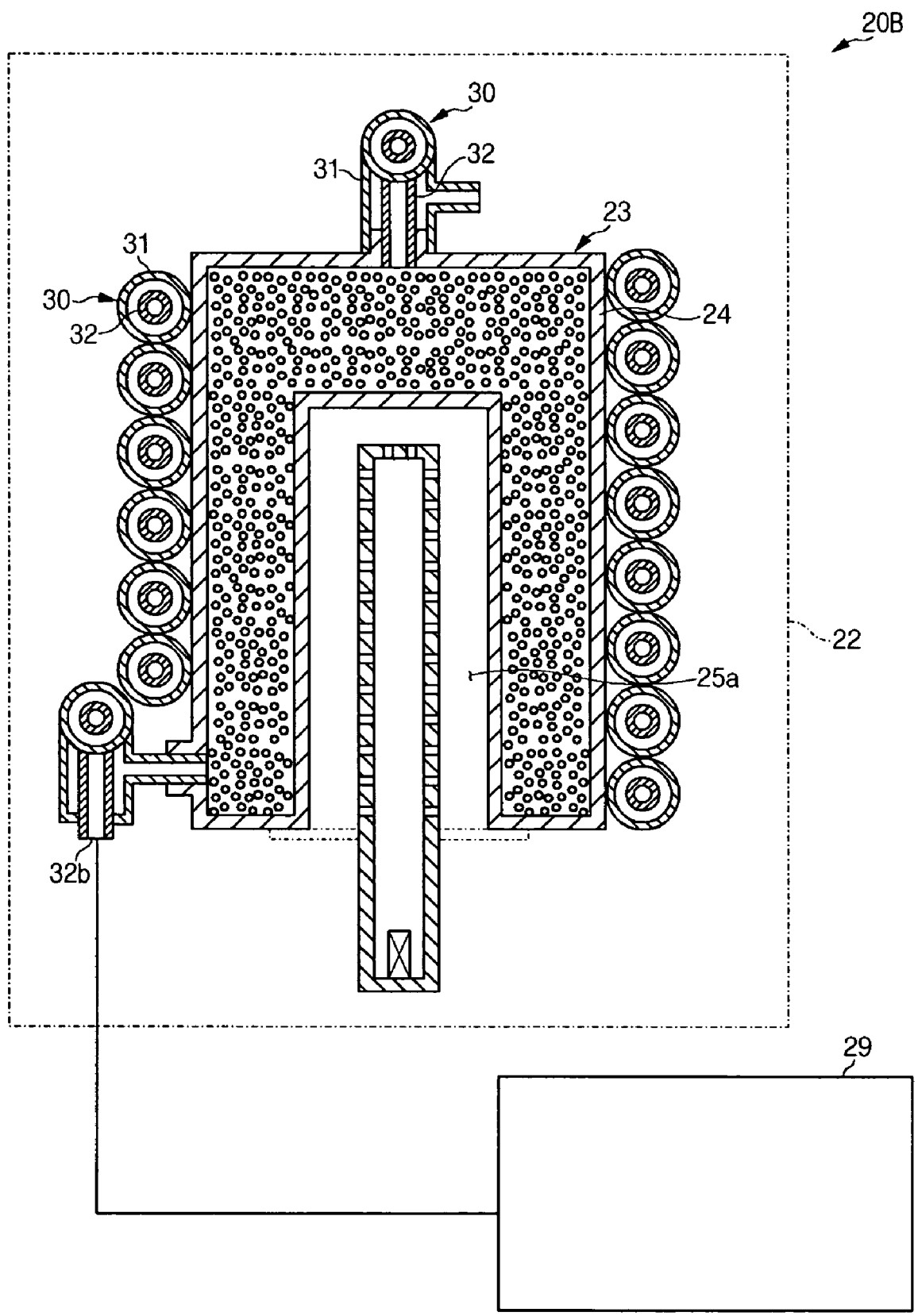
FIG. 5 is a schematic cross-sectional view showing a construction of a reformer according to a third embodiment of the present invention.

FIG. 5 is a schematic cross-sectional view showing a construction of a reformer according to a third embodiment of the present invention.

Referring to the FIG. 5, a reformer 20B according to the third embodiment has substantially the same structure of the aforementioned embodiments but with a carbon monoxide reducing unit 29 for reducing a concentration of carbon monoxide contained in the reforming gas generated from the reforming reaction unit 23.

The carbon monoxide reducing unit 29 is connected to both of the reforming reaction unit 23 and the stack 10 (FIG. 1). More specifically, the carbon monoxide reducing unit 29 is connected to the second channel 32 of the channel member 30, so that the carbon monoxide reducing unit 29 connected to the second outlet 32b of second channel 32 receives the reforming gas discharged from the reactor body 24 of the reforming reaction unit 23. The carbon monoxide reducing unit 29 connected to the stack 10 then supplies the reforming gas containing a reduced concentration of carbon monoxide to the stack 10.

The carbon monoxide reducing unit 29 may include a water-gas shift reaction part (not shown) for reducing the concentration of carbon monoxide and generating hydrogen through a water-gas shift (WGS) reaction of the carbon monoxide contained in the reforming gas. Alternatively, the carbon monoxide reducing unit 29 may have a preferential oxidation reaction part (not shown) for reducing the concentration of the carbon monoxide through a preferential CO oxidation (PROX) reaction of the carbon monoxide contained in the reforming gas and the oxygen.

In the embodiment, the carbon monoxide reducing unit 29 may be constructed with the water-gas shift reaction part or the preferential oxidation reaction part. Alternatively, the carbon monoxide reducing unit 29 may be constructed with the water-gas shift reaction part and the preferential oxidation reaction part.

During the operation of the reformer 20B according to the third embodiment, the reforming gas generated from the reforming reaction unit 23 is supplied through the second channel 32 of the channel member 30 to the carbon monoxide reducing unit 29, and then the carbon monoxide reducing unit 29 reduces the concentration of the carbon monoxide contained in the reforming gas through the water-gas shift catalytic reaction and/or the preferential oxidation reaction and supplies the reforming gas to the stack 10.

Figure 6:
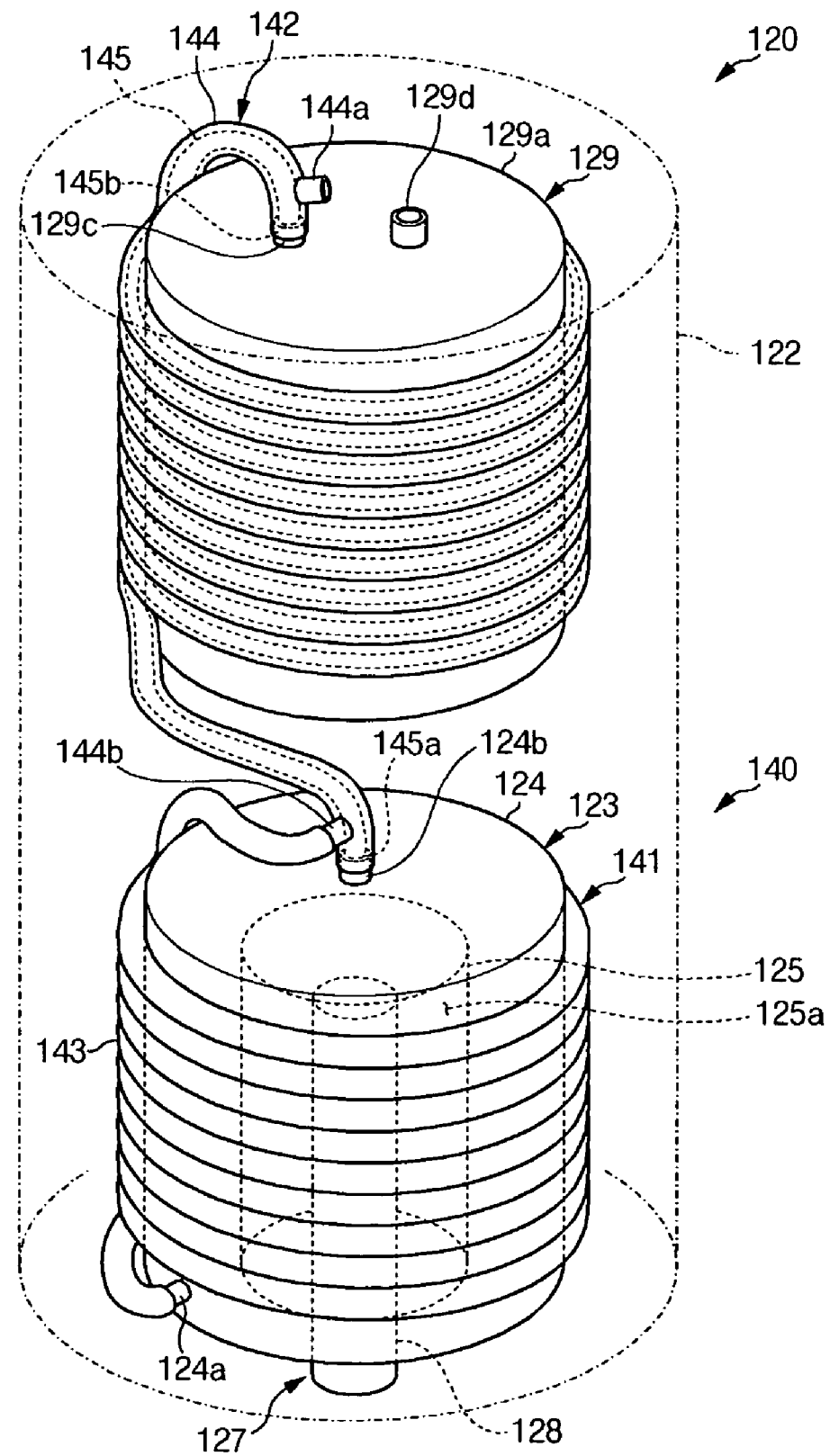
FIG. 6 is a schematic perspective view showing a construction of a reformer according to a fourth embodiment of the present invention.
Figure 7:
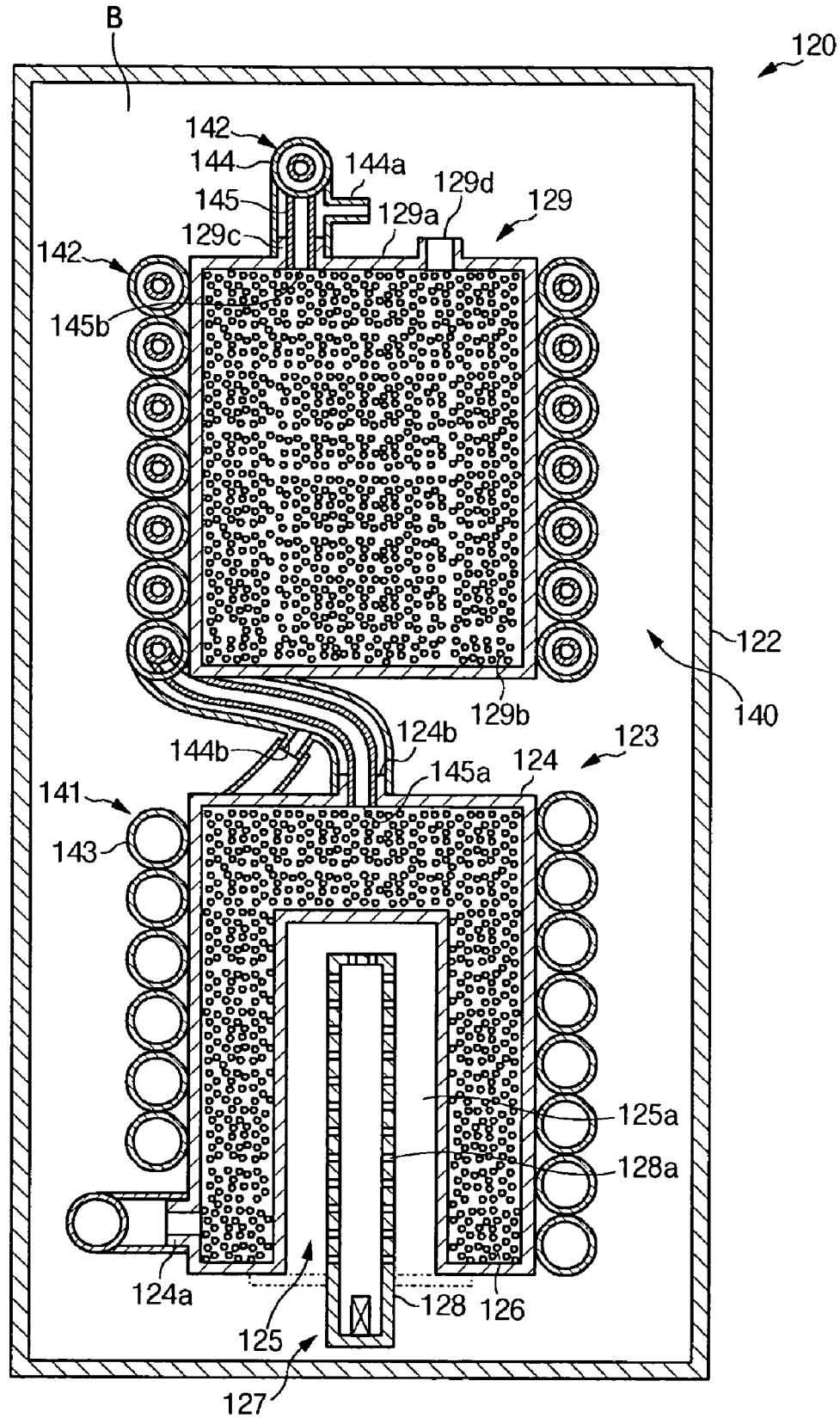
FIG. 7 is a cross-sectional view of FIG. 6.

FIG. 6 is a schematic perspective view showing a construction of a reformer according to a fourth embodiment of the present invention, and FIG. 7 is a cross-sectional view of FIG. 6.

Referring to the FIGS. 6 and 7, a reformer 120 according to the fourth embodiment includes a reforming reaction unit 123 for generating a reforming gas containing hydrogen from a fuel through a fuel reforming reaction using heat; a heat source unit 127 for generating the heat; a carbon monoxide reducing unit 129 for reducing a concentration of carbon monoxide contained in the reforming gas through a catalytic reaction of carbon monoxide and for supplying the reforming gas to an electricity generator 11 (FIG. 1) of a stack 10 (FIG. 1); a reforming reaction unit 123; and a thermal treatment unit 140 for adjusting thermal energy supplied to the carbon monoxide reducing unit 129.

The reforming reaction unit 123 includes a first reactor body 124 having an internal space, and a reforming catalyst 126 contained in the internal space of the first reactor body 124 to promote the fuel reforming reaction.

Here, the first reactor body 124 has a closed cylindrical structure, of which both ends are closed to form an internal space. The first reactor body 124 has a mounting part 125 for accommodating a heat source unit 127. The mounting part 125 has a surround region (e.g., a cavity) 125a formed by recessing the first reactor body 124 in a predetermined depth in a direction of from one end of the first reactor body 124 to the other end of the first reactor body 124. The surround region (e.g., the cavity) 125a is a space for accommodating the heat source unit 127. The surround region 125a can be referred to as an inner region of the first reactor body 124. At one end of the first reactor body 124, a first injection hole 124a for injecting the fuel into the internal space of the first reactor body 124 is disposed. At the other end of the first reactor body 124, a first outlet 124b for discharging the reforming gas generated through the fuel reforming reaction from the internal space of the first reactor body 124 is disposed.

The heat source unit 127 has a structure of igniting and burning the gas fuel together with air. The heat source unit 127 has a burner body 128 mounted in the mounting part 125 of the first reactor body 124. The burner body 128 is substantially pipe shaped with a plurality of nozzle holes 128a and is disposed within the surround region 125a of the mounting part 125.

Since the reforming reaction unit 123 and the heat source unit 127 have substantially the same constructions as those of the first embodiment, detailed description thereof will not be provided again.

The carbon monoxide reducing unit 129 is connected to both of the first reactor body 124 and the stack 10 (FIG. 1). The carbon monoxide reducing unit 129 receives the reforming gas discharged from the first reactor body 124 and supplies the reforming gas containing a reduced concentration of carbon monoxide to the stack 10.

The carbon monoxide reducing unit 129 includes a second reactor body 129a having an internal space and a catalyst 129b contained in the internal space. The catalyst 129b is used to promote a catalytic reaction of the carbon monoxide contained in the reforming gas, such as a water-gas shift (WGS) reaction and/or a preferential CO oxidation (PROX) reaction.

The second reactor body 129a has a closed cylindrical structure, of which both ends are closed to form an internal space. The second reactor body 129a has a second injection hole 129c for injecting the reforming gas discharged from the first reactor body 124 into the internal space and a second outlet 129d for discharging the reforming gas, of which a concentration of carbon monoxide is reduced by the catalyst 129b. Here, the second outlet 129d is connected to the electricity generator 11 (FIG. 1) of the stack (FIG. 1) via a pipe-shaped line.

In the fourth embodiment, the thermal treatment unit 140 has a housing 122 for circulating heat generated from the heat source unit 127 through the surround region 125a of the first reactor body 124 and outside the first reactor body 124 and the second reactor body 129a.

The housing 122 has a hermetically-sealed space (indicated by B in FIG. 7) to entirely contain the heat source unit 127, the first reactor body 124, and the second reactor body 129a. Here, in one embodiment, an inner wall of the housing 122 is separated by a predetermined distance from an outer wall of the first reactor body 124 and an outer wall of the second reactor body 129a. In addition, the housing 122 may be made of a heat-isolating metal and/or a non-metal material having a low thermal conductivity such as stainless steel, ceramic, and/or zirconium.

The heat generated from the heat source unit 127 is circulated from the surround region 125a of the first reactor body 124 through the hermetically-sealed space B of the housing 122 and outside the first reactor body 124 and the second reactor body 129a.

In addition, the thermal treatment unit 140 according to the fourth embodiment further includes first channel and second channel members 141 and 142 for circulating the fuel to outer surfaces of the first and second reactor bodies 124 and 129a and for circulating the reforming gas discharged from the first reactor body 124 to the outer surface of the second reactor body 129a.

The first channel member 141 has a path for transporting the fuel supplied from the fuel tank 51 (FIG. 1) of the fuel supply unit 50 (FIG. 1). The first channel member 141 is disposed to be in contact with the outer surface of the first reactor body 124 and constructed with a pipe winding around the outer surface of the first reactor body 124 in a shape of a coil. That is, the first channel member 141 has a path for transporting the fuel in a helical direction with respect to the outer surface of the first reactor body 124. The first channel member 141 includes a first channel 143 having a shape of a single pipe, of which one end is connected to the first injection hole 124a of the first reactor body 124 and the other end is connected to the second channel member 142.

The second channel member 142 includes channels for transporting the fuel and the reforming gas, wherein the channels are integrally formed in the second channel member 142. The second channel member 142 is disposed to be in contact with the outer surface of the second reactor body 129a and has a double-pipeline structure wherein the second channel member winds around the outer surface of the second reactor body 129a in a shape of a coil.

The second channel member 142 includes a second channel 144 for transporting the fuel and a third channel 145 for transporting the reforming gas discharged from the first reactor body 124, wherein the third channel 145 is disposed in the center of the second channel 144.

The second channel 144 has a first inlet 144a disposed at one end of the second channel 144 and a first outlet 144b disposed at the other end of the second channel 144. Here, the first inlet 144a is connected to the fuel tank 51 (FIG. 1) of the fuel supply unit 50 (FIG. 1) via a pipeline. The first outlet 144b is connected to the other end of the first channel 143.

The third channel 145 has a second inlet 145a disposed at one end of the third channel 145 and a second outlet 145b disposed at the other end of the third channel 145. Here, the second inlet 145a is connected to the first outlet 124b of the first reactor body 124, and the second outlet 145b is connected to the second injection hole 129c of the second reactor body 129a.

During the operation of the reformer 120 according to the fourth embodiment, some portion of the thermal energy generated from the heat source unit 127 is supplied through the surround region 125a of the first reactor body 124 to the first reactor body 124 and the reforming catalyst 126 in the first reactor body 124. The remaining portion of the thermal energy is circulated from the surround region 125a to the hermetically-sealed space B of the housing 122.

During the process, since the first channel 143 of the first channel member 141 winds around the outer surface of the first reactor body 124 in a shape of a coil, the first channel 143 is heated in a predetermined temperature by the thermal energy supplied to the first reactor body 124 and the thermal energy circulated to the hermetically-sealed space B of the housing 122. In addition, since the second channel 144 of the second channel member 142 winds around the outer surface of the second reactor body 129a, the second channel member 142 is heated in a predetermined temperature by the thermal energy circulated to the hermetically-sealed space B of the housing 122.

After that, when the fuel supply unit 50 (FIG. 1) has supplied the fuel to the second channel 144, the fuel is flowed along the second channel 144 in a helical direction and along the first channel 143 in a helical direction. Since the first channel 143 and second channel 144 are maintained in a heated state, the fuel is preheated at a predetermined temperature by the transferred thermal energy, and the preheated fuel is supplied to the internal space of the first reactor body 124. As a result, the reforming reaction unit 123 generates the reforming gas containing hydrogen through the fuel reforming reaction using the thermal energy and the reforming catalyst 126.

The reforming gas is discharged through the first outlet 124b of the first reactor body 124, flowed through the third channel 145 of the second channel member 142, and in-flowed through the second injection hole 129c of the second reactor body 129a into the internal space of the second reactor body 129a. Here, since the second channel member 142 according to the embodiment has a double-pipeline structure, the reforming gas flows in the helical direction along the third channel 145 to be cooled by the fuel flowing through the second channel 144 at a relatively low temperature, so that the reforming gas can be maintained at a temperature range corresponding to the specific operation temperature of the stack 10.

By doing so, the carbon monoxide reducing unit 129 reduces the concentration of carbon monoxide contained in the reforming gas through the water-gas shift catalytic reaction and/or the preferential oxidation reaction of the carbon monoxide and discharges the reforming gas through the second outlet 129d of the second reactor body 129 to supply the reforming gas to the electricity generator 11 (FIG. 1) of the stack 10 (FIG. 1).

In more detail, the operation of the reformer 120 according to the fourth embodiment will be described with an example of the heat source unit 127 for generating heat by igniting and burning the gas fuel with air. In the example, the heat source unit 127 generates thermal energy in a range from about 750 to 800° C. Some portion of the thermal energy is transferred to the reforming reaction unit 123, and some other portion of the thermal energy is transferred to the fuel supplied to the reforming unit 123 by the thermal treatment unit 140.

Therefore, the fuel can be maintained at a preheated state at a temperature corresponding to the specific operation temperature of the reforming reaction unit 123, that is, in a range from about 450 to 500° C. Then, the reforming reaction unit 123 generates the reforming gas maintained at a temperature range from about 600 to 700° C. through the fuel reforming reaction using the reforming catalyst 126. In addition, the reforming gas discharged from the reforming reaction unit 123 maintained at a temperature of about 200° C. by the thermal treatment unit 140 is supplied to the carbon monoxide reducing unit 129. The temperature of about 200 C.° corresponds to the specific operation temperature of the carbon monoxide reducing unit 129.

In addition, the carbon monoxide reducing unit 129 reduces the concentration of carbon monoxide contained in the reforming gas through the water-gas shift catalytic reaction and/or the preferential oxidation reaction and supplies the reforming gas to the stack 10 (FIG. 1).

According to the present invention, thermal energy generated by a heat source unit of a reformer is circulated through a hermetically-sealed space from a reforming reaction unit to outside thereof, so that the thermal energy required for reactions of a reforming reaction unit can be rapidly transferred. As a result, a reaction efficiency and thermal efficiency of the entire reformer can be improved.

In addition, according to the present invention, a reformer has a structure where a reforming reaction unit surrounds a heat source unit, so that it is possible to implement a compact-size system.

Further, according to the present invention, a reformer has a thermal treatment unit capable of supplying thermal energy in a temperature range corresponding to operation temperatures of a reforming reaction unit and a carbon monoxide reducing unit, so that it is possible to maximize operation efficiency of the entire reformer.

While the invention has been described in connection with certain embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A reformer of a fuel cell system, the reformer comprising:
   a heat source unit adapted to generate heat;
   a reforming reaction unit adapted to generate a reformed gas containing hydrogen from a fuel through a fuel reforming reaction using the heat; and
   a channel member adjacent to the reforming reaction unit and having concentric channels adapted to transport the fuel and the reformed gas, the channel member being in a shape of a coil and wound around an outer surface of the reforming reaction unit, wherein the concentric channels are integrally formed into the channel member.

2. The reformer of claim 1, wherein
the reforming reaction unit further comprises:
   a reactor body comprising:
      internal space to contain a reforming catalyst;
      a portion of an external surface of the reactor body, the portion defining and surrounding a cavity;
      a fuel injection hole adapted to inject the fuel into the reactor body;
      and a reformed gas outlet adapted to discharge the reformed gas out of the reactor body; and
   the heat source unit is in the cavity.

3. The reformer of claim 2, wherein the channel member comprises:
   a first channel adapted to transport the fuel, and
   a second channel at the center of the first channel to transport the reformed gas.

4. The reformer of claim 2, wherein the heat source unit comprises a burner body in the cavity and the burner body is adapted to generate the heat by igniting and burning fuel.

5. The reformer of claim 4, further comprising a housing having a hermetically-sealed space adapted to entirely contain the heat source unit and the reforming reaction unit to circulate the heat from the cavity to the hermetically-sealed space.

6. The reformer of claim 3, wherein
the first channel comprises:
   a fuel inlet at one end of the first channel, and
   a fuel outlet at another end of the first channel; and
the fuel outlet is connected to the fuel injection hole of the reactor body.

7. The reformer of claim 6, wherein
the second channel comprises:
   a reformed gas inlet at one end of the second channel, and
   a reformed gas outlet at another end of the second channel; and
the reformed gas inlet is connected to the reformed gas outlet of the reactor body.

8. The reformer of claim 7, further comprising a carbon monoxide reducing unit connected to the reformed gas outlet of the second channel to reduce a concentration of carbon monoxide contained in the reformed gas.

9. A reformer of a fuel cell system, the reformer comprising:
   a heat source unit adapted to generate heat;
   a reforming reaction unit adapted to generate a reformed gas containing hydrogen from a fuel through a fuel reforming reaction using the heat;
   a carbon monoxide reducing unit connected to the reforming reaction unit to reduce a concentration of carbon monoxide contained in the reformed gas; and
   a thermal treatment unit outside the reforming reaction unit and the carbon monoxide reducing unit, and adapted to adjust thermal energy supplied to the reforming reaction unit and the carbon monoxide reducing unit, the thermal treatment unit comprising concentric channels in a shape of a coil and wound around an outer surface of at least one of the reforming reaction unit or the carbon monoxide reducing unit.

10. The reformer of claim 9, wherein
the reforming reaction unit comprises a first reactor body having a first internal space to contain a first catalyst; and
the first reactor body comprises:
   a first injection hole adapted to inject the fuel into the first internal space,
   a first outlet adapted to discharge the reformed gas from the first internal space, and
   a portion of an external surface of the reactor body defining a cavity, the portion surrounding at least a part of the heat source unit.

11. The reformer of claim 10, wherein the heat source unit comprises a burner body in the cavity to generate the heat by igniting and burning fuel, the burner body having a plurality of nozzle holes.

12. The reformer of claim 11, wherein
the carbon monoxide reducing unit comprises a second reactor body having a second internal space to contain a second catalyst; and
the second reactor body comprises:
   a second injection hole adapted to inject the reformed gas into the second internal space, and
   a second outlet adapted to discharge the reformed gas from the second internal space.

13. The reformer of claim 12, wherein the thermal treatment unit comprises a housing defining a hermetically-sealed space containing the burner body, the first reactor body, and the second reactor body, and is adapted to circulate the heat from the cavity to the hermetically-sealed space.

14. The reformer of claim 13, wherein the housing comprises a material selected from a group consisting of heat-isolating ceramic, stainless steel, zirconium, and combinations thereof.

15. The reformer of claim 13, wherein
the thermal treatment unit comprises:
   a first channel member adapted to circulate the fuel, and
   a second channel member connected to the first channel member and having channels integrally formed into the second channel member, the channels comprising a shape of a coil and wound around an outer surface of the second reactor body, the channels being adapted to circulate the fuel and the reformed gas.

16. The reformer of claim 15, wherein the first channel member comprises a first channel having one end connected to the first injection hole of the first reactor body and another end connected to the second channel member.

17. The reformer of claim 16, wherein the second channel member comprises:
   a second channel adapted to transport the fuel, and
   a third channel at the center of the second channel to transport the reformed gas.

18. The reformer of claim 17, wherein
the second channel comprises:
   a first channel-inlet at one end of the second channel, and
   a first channel-outlet at another end of the second channel; and
the first channel-outlet is connected to the another end of the first channel.

19. The reformer of claim 18, wherein
the third channel comprises:
   a second channel-inlet at one end of the third channel, and
   a second channel-outlet at another end of the third channel;
the second channel-inlet is connected to the first outlet of the first reactor body; and
the second channel-outlet is connected to the second injection hole of the second reactor body.

20. A reformer of a fuel cell system, the reformer comprising:
   a heat source unit adapted to generate heat;

a reforming reaction unit adapted to generate a reformed gas containing hydrogen from a fuel through a fuel reforming reaction using the heat, the reforming reaction unit having a cavity between the reforming reaction unit and the heat source unit; and a thermal treatment unit outside the reforming reaction unit adapted to adjust thermal energy supplied to the reforming reaction unit, the thermal treatment unit having concentric channels adapted to transport the fuel and the reformed gas, wherein the concentric channels are shaped into a coil and wound around an outer surface of the reforming reaction unit.

21. The reformer of claim 20, wherein the concentric channels comprise:

a first channel adapted to transport the fuel, and a second channel at the center of the first channel to transport the reformed gas.

22. The reformer of claim 20, wherein the thermal treatment unit comprises a housing defining a hermetically-sealed space containing the heat source unit and the reforming reaction unit, the thermal treatment unit being adapted to circulate the heat from the heat source unit to the hermetically-sealed space.

23. The reformer of claim 20, further comprising a carbon monoxide reducing unit connected to the reforming reaction unit to reduce a concentration of carbon monoxide contained in the reformed gas.

24. The reformer of claim 23, wherein the thermal treatment unit comprises:

a first channel having a shape of a coil and wound around an outer surface of the reforming reaction unit and adapted to circulate the fuel, a second channel having a shape of a coil and wound around an outer surface of the carbon monoxide reducing unit and adapted to circulate the fuel, and a third channel at the center of the second channel to transport the reformed gas.

25. The reformer of claim 24, wherein the first channel is connected to an injection hole of the reforming reaction unit and the second channel; and the third channel is connected to an outlet of the reforming reaction unit and an injection hole of the carbon monoxide reducing unit.

* * * * *